United States Patent [19]

Marcoux et al.

[11] 4,108,125
[45] Aug. 22, 1978

[54] HIGH EFFICIENCY EARLY FUEL EVAPORATION CARBURETION SYSTEM

[75] Inventors: Leo Marcoux, Rehoboth; Peter G. Berg, Norton, both of Mass.

[73] Assignee: Texas Instruments Incorporated, Dallas, Tex.

[21] Appl. No.: 722,310

[22] Filed: Sep. 10, 1976

[51] Int. Cl.² ............................................ F02M 31/00
[52] U.S. Cl. ................................ 123/122 F; 261/142; 219/206; 219/207
[58] Field of Search .................... 123/122 F; 219/206, 219/207, 307, 374, 375, 376, 381, 382, 505; 261/142; 338/22 R

[56] References Cited

U.S. PATENT DOCUMENTS

| | | | |
|---|---|---|---|
| 1,415,184 | 5/1922 | McIlrath | 219/207 |
| 2,587,713 | 3/1952 | Elliott | 219/207 |
| 3,163,841 | 12/1964 | Willett | 219/375 |
| 3,632,971 | 1/1972 | Flanagan | 219/505 |
| 3,654,432 | 4/1972 | Dyre | 219/375 |
| 3,666,924 | 5/1972 | Jensen | 219/505 |
| 3,927,300 | 12/1975 | Wada | 219/381 |
| 3,956,614 | 5/1976 | Hervert | 219/381 |
| 3,987,772 | 10/1976 | McBride | 123/122 F |
| 4,020,812 | 5/1977 | Hayward | 123/122 F |

*Primary Examiner*—Ronald H. Lazarus
*Attorney, Agent, or Firm*—John A. Haug; James P. McAndrews

[57] ABSTRACT

A carburetion system for improving cold starting of an automotive engine comprises a carburetor having an air-fuel passage, an air inlet to the passage, a fuel inlet to the passage for mixing fuel and air in the passage, and an outlet from the passage for delivering a mixture of an air and vaporized fuel to the engine. A heater comprising a ceramic resistor body of a material of positive temperature coefficient of resistivity has a plurality of relatively large passages extending in a pattern in spaced side-by-side relation to each other through the body between opposite ends of the body for defining thin webs of the resistor material between adjacent body passages. The heater is mounted at the outlet of the carburetor air-fuel passage with the heater passages aligned with the air-fuel passage to pass the air-fuel mixture through the heater passages in heat transfer relation to the body. Ohmic contacts are disposed on the inner walls of the heater body passages to provide a large area of ohmic contact to the resistor material. The ohmic contacts in alternate body passages are connected together at one end of the body while the ohmic contacts in the other body passages are connected together at the opposite end of the body, each group of interconnected ohmic contacts being connected to a system terminal extending around the side of the resistor body for directing electrical current through the thin webs of resistor material between ohmic contacts of opposite polarity in adjacent body passages, whereby the heater means is more efficiently operable in a 12 volt automotive power supply system to heat the air-fuel mixture for achieving improved fuel vaporization promptly after initiation of engine operation and for achieving improved flow of the air-fuel mixture to the engine.

8 Claims, 6 Drawing Figures

HIGH EFFICIENCY EARLY FUEL EVAPORATION CARBURETION SYSTEM

BACKGROUND AND SUMMARY OF INVENTION

In a commonly assigned, earlier filed, copending application of the present inventors Ser. No. 721,728 a novel and improved carburetion system for an automotive engine is shown to comprise a carburetor having an air-fuel passage, an air-inlet to the passage, a fuel inlet to the passage for mixing fuel and air in the passage, and an outlet from the passage for delivering a mixture of air and vaporized fuel to the engine. In that improved carburetion system, a heater means comprising a body of ceramic resistor material of positive temperature coefficient of resistivity is provided with a plurality of passages extending through the resistor body and with means for directing electrical current through the body to heat the body. The heater means is mounted at the outlet of the carburetor air-fuel passage for passing the air-fuel mixture through the heater passages in heat transfer relation to the body, thereby to facilitate vaporization of the fuel prior to delivery of the air-fuel mixture to the engine. The heater means is adapted to be energized upon initiation of engine operation. In this way, the improved carburetion system of the noted earlier application is adapted to enhance fuel efficiency during engine start up and, particularly, where engine start up occurs in low ambient temperature conditions, is adapted to reduce the emission of unburned hydrocarbon pollutants and the like to the atmosphere in the engine exhaust.

However, it has been found that it is difficult to achieve efficient operation of the heater means in such a system from a 12 volt automotive power supply, that improved heater efficiency is of particular importance in order to achieve a desired degree of improvement in fuel vaporization utilizing the available power, and that it is desirable to achieve this improved degree of fuel vaporization without imposing excessive restriction on flow of the air-fuel mixture to the engine.

It is an object of this invention to provide a novel and improved high efficiency early fuel evaporation carburetion system for an automobile engine; to provide such an improved system which is operable without unduly restricting the flow of an air-fuel mixture to the engine; to provide such an improved system which is efficiently operable from a 12 volt automotive power supply; to provide such an improved system which is adapted to achieve improved fuel efficiency and reduction in exhaust gas pollutants in initiating engine operation from a cold start; and to provide such an improved system which is of simple, compact, rugged and inexpensive structure.

Briefly described, the novel and improved carburetion system of this invention includes a conventional carburetor having an air-fuel passage, an air inlet to the passage, a fuel inlet to the passage for mixing fuel with air in the air-fuel passage, and an outlet from the air-fuel passage for delivering a mixture of air and vaporized fuel to an automotive engine. A heater means comprising a body of ceramic material of positive temperature coefficient of resistivity having a plurality of passages extending through the body has means for directing electrical current through the body and is mounted at the outlet of the carburetor air-fuel passage for passing the air-fuel mixture through the heater passages in heat transfer relation to the heater body. In accordance with this invention, the heater body is provided with a relatively small number of passages of relatively large cross sectional size for defining very thin webs of the resistor material between the passages so that the air-fuel mixture is passed readily through the heater passages without unduly impeding the flow of the air-fuel mixture to the engine. Ohmic contacts are disposed on the resistor body along the inner walls of the resistor body passages for providing the resistor body with a large effective ohmic contact area to the resistor body material. The ohmic contacts formed on the walls of alternate body passages are electrically connected together at one end of the body, preferably by a first coating of electrically conductive material which is formed on that one body end and which also extends around the side of the body adjacent that one body end. The ohmic contacts in the other body passages are electrically connected together at the opposite end of the body by a second coating of electrically conductive material on that opposite body end which also extends around the sides of the body adjacent that opposite body end. The resistor body is mounted within a housing of rigid electrically insulating material which has apertures on the opposite sides thereof aligned with the heater passages. The housing also includes mounting holes and the like for mounting the heater between the carburetor and the intake manifold of the automotive engine. A pair of generally wave-shaped annular terminals are mounted within the housing extending around the resistor body in resilient engagement with the first and second coatings respectively at the sides of the resistor body, each of the terminals having a portion extending exteriorly of the housing to be connected in the 12 volt power supply of the automobile. The heater means is preferably arranged to be energized when operation of the engine is initiated and to be effectively deenergized thereafter when the engine has warmed up to its optimum operating temperature.

In this arrangement, the carburetion system does not unduly restrict the flow of air-fuel mixture to the engine. However, the 12 volt power supply of the automobile is effective to direct a substantial electrical current through the thin webs of the resistor body material between ohmic contacts of different polarity formed within adjacent body passages. In this way, the heater means of the system efficiently generates a large amount of heat with the available power for heating the air-fuel mixture passing through the heater passages to provide significantly improved vaporization of the fuel in the mixture. Further, the heater means used in the system is compact, rugged and inexpensive and is easily utilized with a conventional carburetor without excessively increasing the height of the system over the automobile engine.

Other objects, advantages and details of the improved high efficiency carburetion system of this invention appear in the following detailed description of preferred embodiments of the invention, the detailed description referring to the drawings in which:

DESCRIPTION OF THE EMBODIMENTS

Figure 1:
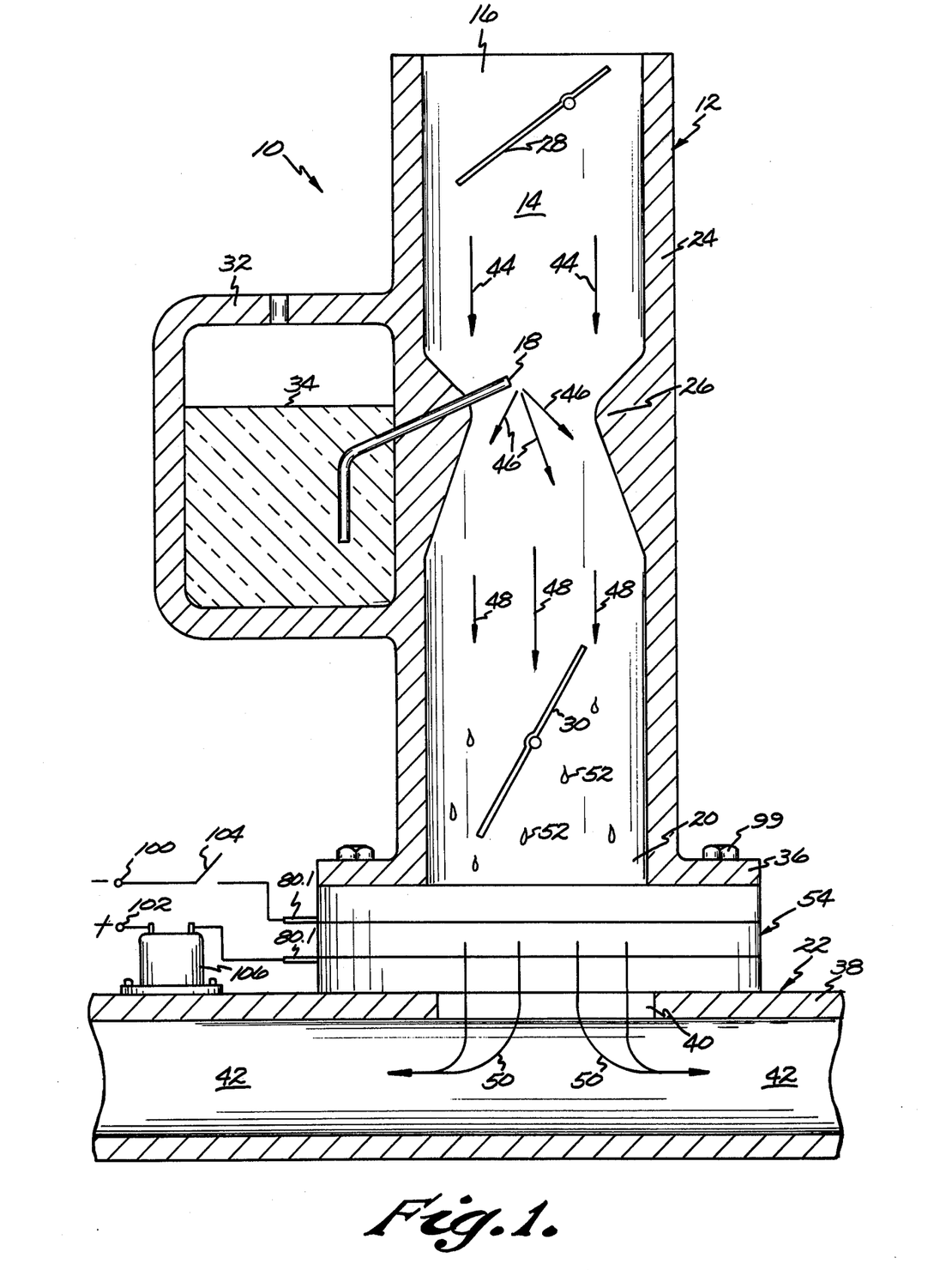
FIG. 1 is a section view along the longitudinal axis of the improved carburetion system of this invention.
Figure 2:
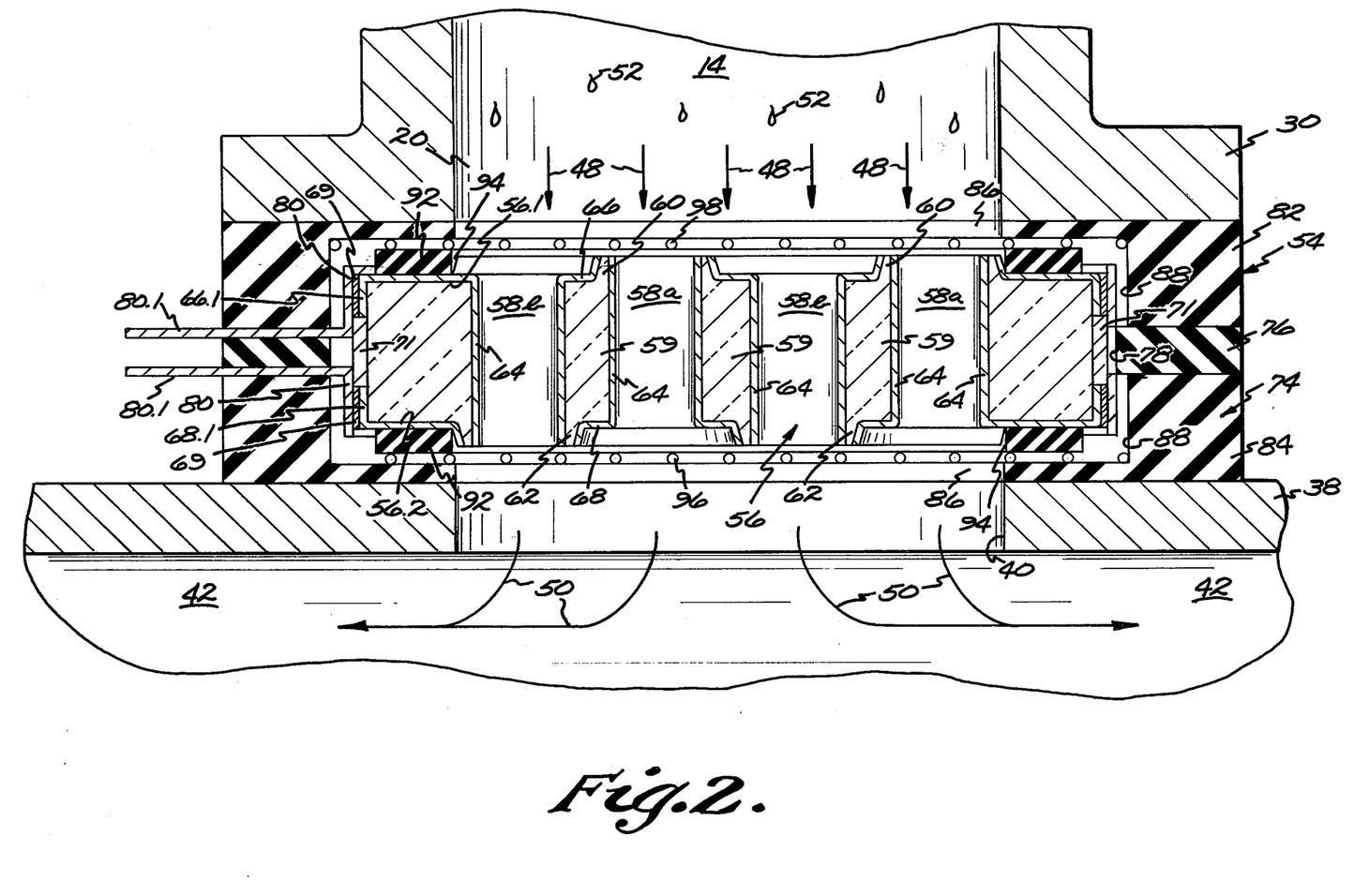
FIG. 2 is a section view to enlarged scale of the heater means utilized in the system of FIG. 1.

Referring to the drawings, 10 in FIGS. 1 and 2 indicates the novel and improved high efficiency carburetion system of this invention which is shown to include a carburetor 12 of any conventional type having an air-fuel passage 14, having an air inlet 16 to the air-fuel passage, having a fuel inlet 18 to the air-fuel passage for mixing fuel with air in the air-fuel passage, and having an outlet 20 from the air-fuel passage for delivering a mixture of air and vaporized fuel to an automotive engine 22. Such a conventional carburetor typically includes a body 24 defining the air-fuel passage 14 with a venturi portion 26 as shown in FIG. 1, choke valve means 28, throttle plate means 30, and a supply chamber 32 for gasoline fuel 34 as is diagrammatically shown in FIG. 1. The conventional carburetor also typically includes a flange 36 for use in mounting the carburetor relative to the intake manifold 38 of the engine with the air-fuel passage 14 of the carburetor aligned with an opening or entry 40 to the intake manifold passage 42 leading to the engine cylinders. In operation of the conventional carburetor, a vacuum established in the intake manifold while the engine is running draws air into the carburetor inlet 16 as indicated by the arrows 44 while the reduced pressure established at the venturi constriction in the air-fuel passage also draws fuel through the jet or nozzle inlet 18 as indicated by the arrows 46, thereby to create a mixture of air and vaporized fuel in the air-fuel passage as indicated by the arrows 48. The air-fuel mixture 48 is then drawn through the air-fuel passage outlet 20 into the intake manifold as indicated by the arrows 50 for delivery to the engine as shown in FIGS. 1 and 2. In the conventional carburetor, the throttle plate is movable through appropriate linkages and controls for regulating the volume of air-fuel mixture delivered to the engine and the choke valve means 28 is movable in response to the pull of the intake manifold vacuum or the like and to thermally responsive spring means for regulating the entry of air into the carburetor. As the carburetor 12 is of any conventional type it is not further described herein and it will be understood that the improved high efficiency carburetion system of this invention utilizes any single, double or quadruple barrel carburetor or other fuel supply system or the like which is adapted to furnish an air-fuel mixture to an automotive engine.

In this regard, when operation of an automobile engine is initiated from a cold start, particularly under low ambient temperature conditions, the air 44 and fuel 46 drawn into the carburetor 12 are frequently at too low a temperature to effect full vaporization of the fuel within the air-fuel passage of the carburetor. Further, the temperature of the engine 22 is also too low for a period after startup to effect sufficient heating of the air-fuel mixture 48 to achieve full vaporization of the fuel in the mixture. In the conventional carburetor, the choke 26 is commonly adapted to restrict the entry of air into the carburetor during the engine start-up or warm-up period, thereby to assure that the air-fuel mixture delivered to the engine is sufficiently rich in fuel to provide smooth engine starting. As a result, under these starting conditions, the air-fuel mixture 48 commonly includes fuel droplets 52 or other unvaporized fuel as indicated in FIG. 1. Therefore, the engine achieves only relatively poor fuel efficiency during engine start up and, more important, excessive quantities of unburned hydrocarbon pollutants tend to be emitted to the atmosphere in the engine exhaust during motor starting.

Figure 3:
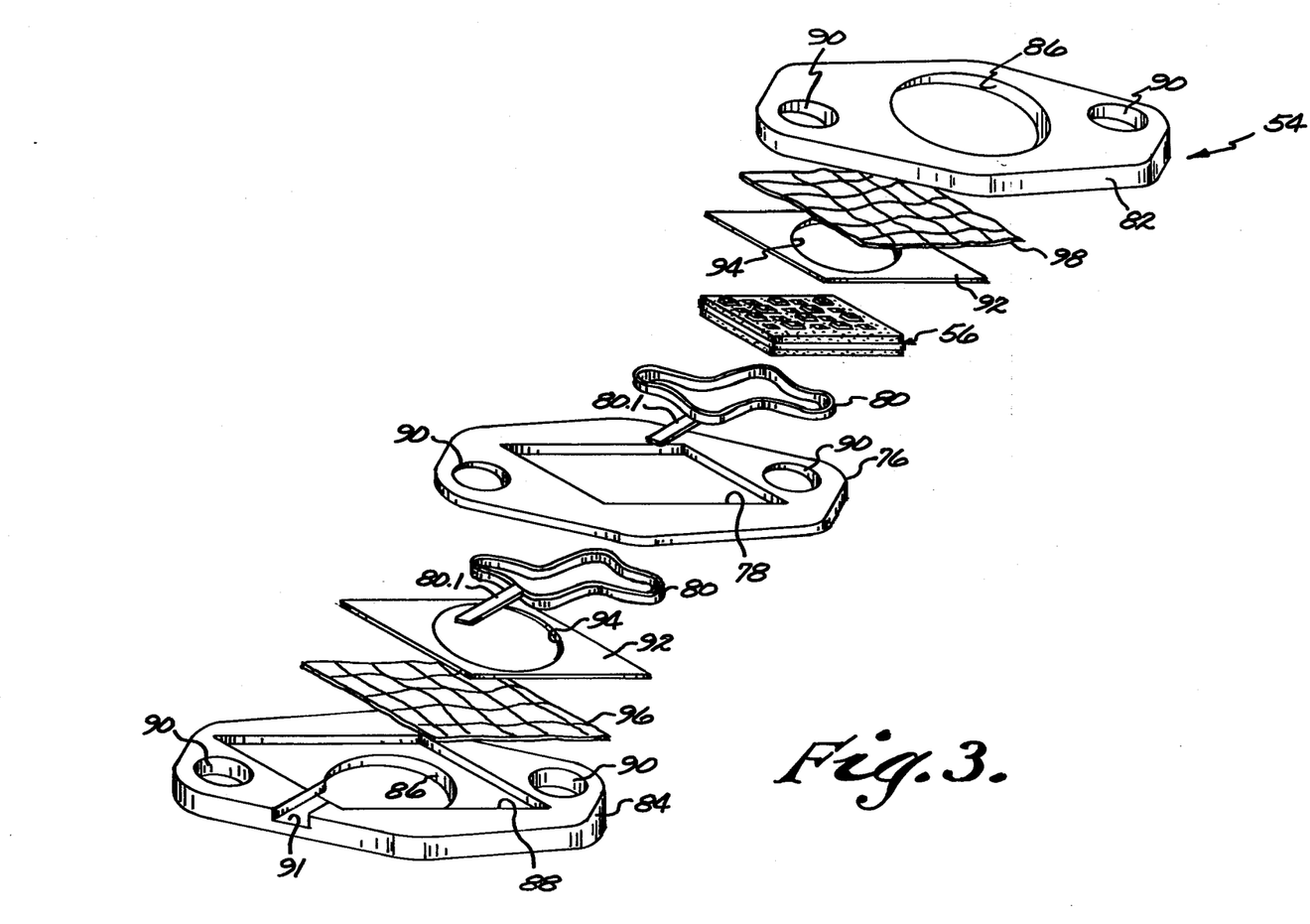
FIG. 3 is an exploded view to relatively smaller scale of the heater means utilized in the system of FIG. 1.
Figure 6:
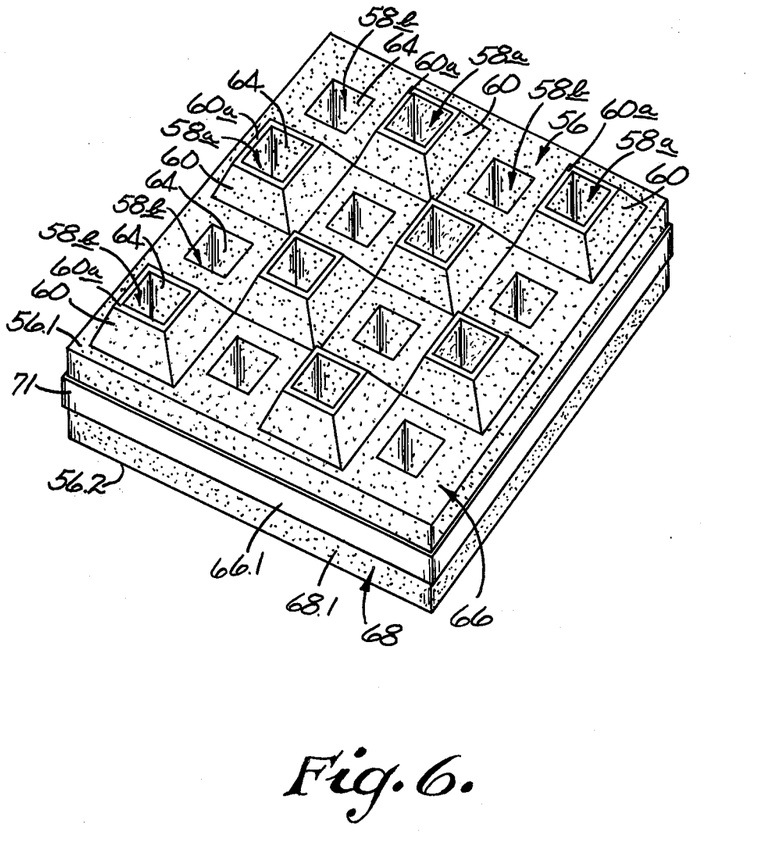
FIG. 6 is a view of the heater shown in FIG. 3 to enlarged scale.

Accordingly, in the carburetion system 10 of this invention, heater means 54 are interposed between the carburetor 12 and the intake manifold 38 for heating the air-fuel mixture 48 being delivered to the engine, thereby to provide significantly improved vaporization of the fuel constituent of the air-fuel mixture prior to the delivery of the mixture to the engine. In order to achieve such improved fuel vaporization without unduly restricting free flow of the air-fuel mixture to the engine, it is necessary to more efficiently utilize the power available for this purpose from the 12 volt automotive power supply. Accordingly, the heater means used in the system 10 of this invention comprises a heater body 56 of a ceramic material or the like of positive temperature coefficient of resistivity (PTC), the body having a plurality of passages 58 which extend in a pattern in spaced side-by-side relation to each other through the body between opposite ends 56.1 and 56.2 of the body for defining thin webs 59 of the resistor material between adjacent passages in the body. Preferably, as shown particularly in FIGS. 2 and 6, abutments or parapets 60 of the resistor material are formed around the margins of the ends of alternate one 58a of the body passages at one end 56.1 of the body while similar abutments or parapets 62 are formed around the ends of the other body passages 58b at the opposite end 56.2 of the body. Electrically conductive ohmic contacts 64 (stippled in FIG. 6) or other suitable contact means are attached to the resistor body along the inner walls of each of the passages 58. The ohmic contacts 64 in said other body passages 58b are electrically connected to each other at said one end 56.1 of the resistor body by a coating 66 (stippled in FIG. 6) of electrically conductive material which is deposited on the body end 56.1 extending around the sides of the abutments 60 as shown in FIGS. 3 and 6. In this way, the coating 66 electrically connects the ohmic contacts 64 in the passages 58b but is spaced from the ohmic contacts 64 in the body passages 58a by the tops 60a of the abutments 60. Similarly, the ohmic contacts 64 in said alternate body passages 58a are electrically connected to each other at the opposite end 56.2 of the resistor body by a coating 68 (stippled in FIG. 6) of electrically conductive material which extends around the sides of the abutments 62. Preferably, as shown in FIG. 2, each of the coatings 66 and 68 has a portion 66.1 and 68.1 extending circumferentially around the sides of the resistor body adjacent to a respective end of the body. Preferably, the coating portions 66.1 and 68.1 are further coated (as indicated at 69 in FIG. 2) with an electrically conductive material characterized by displaying a relatively low electrical sheet and surface contact resistance. Preferably also, a protective coating 71 of electrically insulating material is adhered to the resistor body between the coating portions 66.1 and 68.1.

Typically, for example, the resistor body 56 is formed of a lanthanum-doped barium titanate ceramic resistor material which has a positive temperature coefficient of resistivity and which is adapted to display a sharp, anomalous increase in resistivity when heated to a selected temperature. Preferably, for example, the body is formed of a ceramic titanate having the empirical formula of $BA_{.968} Pb_{.030} La_{.002} Ti O_3$ which has a room temperature resistivity of about 36 ohms-centimeters and a Curie temperature of about 140° C. and which is adapted to display a sharp, anomalous increase in resistivity to about $10^5$ ohm-centimeters when heated above its anomaly temperature to about 200° C.

In the carburetion system 10 of this invention, the passages 58 in the resistor body 56 are each preferably of square cross section or the like and are each preferably of relatively large cross-sectional size on the order of at least about 0.100 inches on a side. The webs 59 of resistor material between the body passages are also relatively thin on the order of not more than about 0.060 inches in thickness. Typically, for example, the passages 58 are each of square cross section of about 0.140 inches on a side and are spaced from the adjacent body passage by a web 59 of resistor material of about 0.040 inches thickness, the body including eight rows of such passages each having eight passages in the row. Preferably, the resistor body 56 has an overall thickness of about 0.250 inches so that each passage 58 has a length of about this dimension.

In the carburetion system 10 of this invention, the resistor body 56 is preferably mounted relative to the carburetor 12 so that the resistor body passages are aligned with the air-fuel passage 14 to pass the air-fuel mixture 48 through the passages 58 in heat-transfer relation to the body. With the construction of the resistor body 56 as above described, the body is adapted to serve as a highly efficient fluid heater and is particularly adapted to furnish a large quantity of heat to the air-fuel mixture 48 even though the heater body is energized at a very low voltage such as the 12 volt power supply system available in an automobile. That is, when the coatings 66 and 68 at the ends of the resistor body are connected to appropriate terminals, electrical current is directed through each of the webs 59 of resistor material located between adjacent body passages 58. This current flows between one group of ohmic contacts 64 of one polarity attached to the coating 66 and the second group of ohmic contacts of opposite polarity attached to the coating 68. In this way, the plurality of ohmic contacts in the body passages cooperate to provide a large effective area of ohmic contact to the resistor material. On the other hand, the thin nature of the webs 59 between the body passages permit a relatively large current to be directed through the thin webs for each unit area of the ohmic contacts even though a relatively low voltage is applied across the ohmic contacts of opposite polarity. Further, even if resistivity gradients should occur within the resistor body between opposite ends of the body as a result of flow of the air-fuel mixture 48 through the body passages, the occurrence of higher resistivity in the body adjacent one body end does not tend to restrict heat generation in other parts of the body. Accordingly, even though the passages 58 are relatively large to permit flow of air-fuel mixture through the passages without significant restriction, a large amount of heat is efficiently generated by the resistor body and is transferred to the air-fuel mixture to effect efficient heating of the air-fuel mixture.

Figure 4:
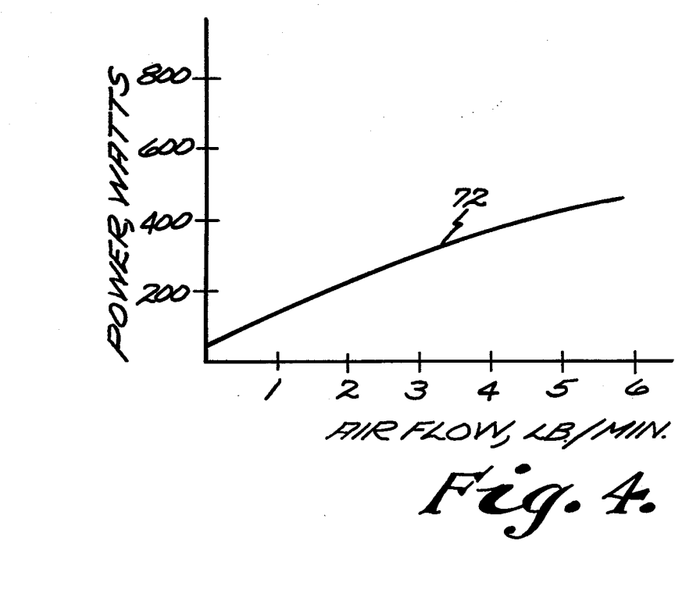
FIGS. 4 and 5 are graphs illustrating performance characteristics of the system of FIG. 1.
Figure 5:
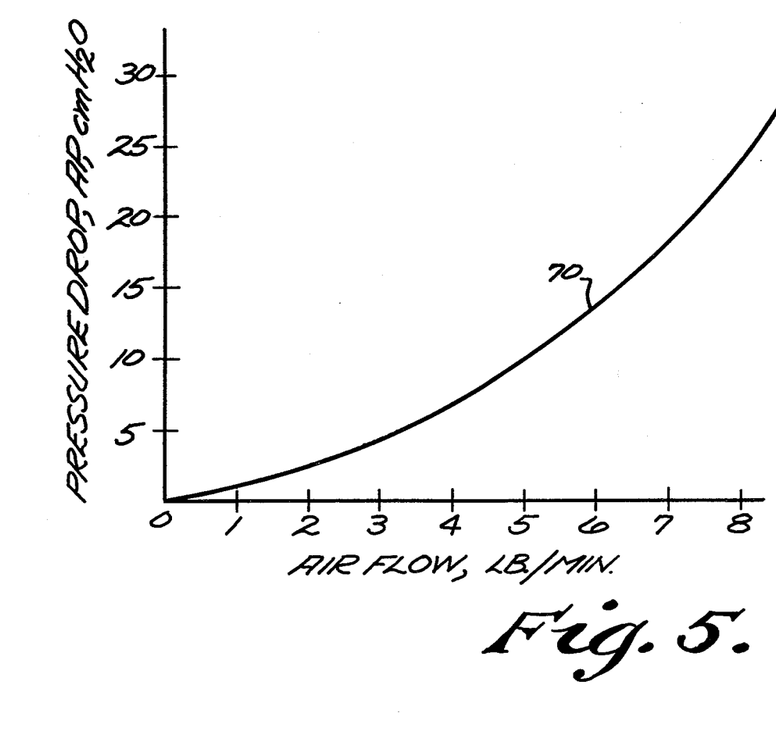

For example, where the resistor body 56 has a thickness of 0.250 inches and has eight rows of eight passages each extending through the body, each passage being of square cross section 0.140 inches on a side and being separated from adjacent passages by webs 59 of about 0.040 inches thickness, the body is adapted to pass substantial volumes of air-fuel mixture through the passages 58 with relatively slight restriction of the flow of the air-fuel mixture as shown in FIG. 5. That is, the body passes a substantial volume of the air-fuel mixture with only a small pressure drop occurring between opposite ends of the body as indicated by the curve 70 in FIG. 5. For example, where 5 pounds of air-fuel mixture per minute (69.25 cubic feet of air-fuel mixture per minute), as is typically directed through the primary stage of a two barrel carburetor in operation of an automotive engine 22, is passed through the heater body passages, this flow results in a pressure drop of only 12 centimeters of water (0.15 pounds per square inch) across the resistor body. However, when energized by a 12 volt automotive power supply, the heater body generates very substantial quantities of heat as indicated by curve 72 in FIG. 4. That is, where 5 pounds per minute of the air-fuel mixture is directed through the body passages, the heater body 56 is adapted to generate and transfer 400 watts of energy to the air-fuel mixture. This heat transfer is effective to raise the temperature of air-fuel mixture by about 12° F. and to provide significantly improved vaporization of the fuel constituent of the mixture particularly when the air and fuel constituents are introduced to the carburetor 12 at a relatively low temperature. Of course, the heater body is adapted to start heating the air-fuel mixture immediately after the initiation of motor operation and is therefore adapted to provide its improvement in fuel vaporization when that improvement is most necessary before the engine itself has warmed up to a significant extent. Further, the positive temperature coefficient of resistivity of the resistor body material assures that the heater body is self-regulating. That is, as the body temperature increases, the resistivity of the body also increases to reduce the current level in the body, whereby the body temperature tends to stabilize at a safe temperature at which heat generated in the body balances the heat dissipated from the body.

As fluid heater resistors of the character of the resistor body 56 as above described are more fully described in commonly assigned, earlier filed copending applications for patent Ser. No. 721,727 and Ser. No. 721,729, the resistor body 56 is not further described herein and it will be understood that the heater means is adapted to achieve highly efficient heating of the air-fuel mixture 48 from a low voltage power source without significantly restricting flow of the air-fuel mixture through the heater body passages.

In the carburetion system 10 of this invention, the heater means 54 also preferably includes housing means 74 for permitting convenient mounting of the resistor body 56 between the carburetor 12 and the intake manifold 38 without unduly increasing the height of the carburetion system, Preferably, a spacer 76 formed of a rigid electrical insulating material such as a phenolic resin has a central opening 78 fitted around the resistor body 56. A pair of generally wave-shaped, annular terminals 80 of an electrically conductive spring material such as beryllium copper are fitted around the sides of the resistor body adjacent respective ends of the body, thereby to resiliently engage the coating portions 66.1 and 68.1 and the low contact resistance coatings 69 on the sides of the body. In this arrangement, the terminals 80 make multiple point pressure contact with the low resistance coatings 69 as will be understood, and the terminals are separated from each other by the spacer 76. Each terminal 80 has a terminal portion 80.1 extending laterally therefrom as shown particularly in FIG. 3. Two outer housing sections 82 and 84 also preferably of a phenolic resin each have an aperture 86 and a recess 88 therein and have the recesses 88 fitted over the ends of the resistor body so that the apertures 86 are aligned with the resistor body passages 58. Preferably, each of the outer housing sections 82 and 84 is cemented or otherwise secured in sealed relation to one side of the spacer 76 and the housing sections and spacer are provided with mounting holes 90 for use in mounting the heater means 54 to the carburetor 12 and the intake manifold 38. Each housing section has a groove 91 for permitting one of the extending portions 80.1 of the terminals to extend exteriorly of the housing 74. Preferably, a gasket 92 of a compressible material having an opening 94 therein is also enclosed between each housing section and the resistor body 56 for securely positioning the ceramic resistor body within the housing 74 without risk of damage to the ceramic body when exposed to shock. Preferably, a screen mesh material 96 of a non-conductive material such as fiberglass is also enclosed within the housing at the outlet end of the housing 74 between the resistor body 56 and the housing section 84 for preventing any chips of the ceramic resistor body from being passed into the engine 22. Preferably, also, a similar screen mesh 98 is enclosed in the housing between the resistor body 56 and the housing section 82 for dispersing fuel droplets 52 entering the body passages to facilitate vaporization of the droplets.

With this construction of the heater means 54 as above described, the heater means is conveniently mounted between the carburetor 12 and the intake manifold 38 in the manner shown by use of mounting screws 99. The terminal portions 80.1 of the heater means are also easily connected to a 12 volt power system or the like of the automobile as is diagrammatically illustrated in FIG. 1 by the power supply terminals 100 and 102. Preferably, as is also diagrammatically shown in FIG. 1, the heater means 54 is arranged to be energized when the ignition switch 104 is closed for initiating operation of the engine 22. Similarly, a control means 106 is interposed in series with the heater means 54 for deenergizing the heater means or reducing the output of the heater means a period of time after the initiation of motor operation when the engine 22 has reached its full operating temperature and when operation of the heater means 54 is no longer necessary or useful. As has been described in the previously noted application for patent, Ser. No. 721,728, such control means 106 comprise conventional time delay relay means or the like, thermostat switch means responsive to the temperature of the engine 22 or other conventional control means as may be desired.

It should be understood that although preferred embodiments of the carburetion system of this invention have been described by way of illustrating this invention, the invention includes all modifications and equivalents of the disclosed embodiments falling within the scope of the appended claims.

I claim:
1. A carburetion system comprising carburetor means having an air-fuel passage, an air-inlet to the air-fuel passage, a fuel inlet to the air-fuel passage for mixing fuel with air in the air-fuel passage, and an outlet from the air-fuel passage for delivering a mixture of air and vaporized fuel to an engine, heater means comprising a body of electrical resistor material of positive temperature coefficient of resistivity having a plurality of heater passages extending in a pattern in spaced side-by-side relation to each other through the body between opposite ends of the body defining a plurality of webs of the resistor material between the heater passages, electrically conductive contact means in electrical engagement with the resistor material on the inner walls of the heater passages, a first electrically conductive interconnection coating on one end of the resistor body electrically connecting the contact means in alternate ones of the heater passages together at said one end of the body, a second electrically conductive interconnection coating on the opposite end of the resistor body electrically connecting the contact means in the other heater passages together at said opposite end of the body, means for directing electrical current through the body between contact means connected to said first coating and contact means connected to said second coating, and means mounting the resistor body for passing at least part of at least one constituent of said air-fuel mixture through the heater passages in heat-transfer relation to the resistor body to facilitate vaporizing of the fuel constituent of the air fuel mixture.

2. A carburetion system as set forth in claim 1 wherein said heater means is mounted to pass said air-fuel mixture through said heater passages.

3. A carburetion system as set forth in claim 2 wherein said heater means is mounted at the outlet of said carburetor means with said heater passages aligned with said air-fuel passage.

4. In a carburetion system comprising carburetor means having an air-fuel passage, an air inlet to the air-fuel passage, a fuel inlet to the air-fuel passage for mixing fuel with air in the air-fuel passage, and an outlet from the air-fuel passage for delivering a mixture of air and vaporized fuel to an engine, heater means for said air-fuel mixture comprising a body of electrical resistor material of positive temperature coefficient of resistivity having a plurality of heater passages extending in a pattern in spaced side-by-side relation to each other through the body between opposite ends of the body defining a plurality of webs of the resistor material between the heater passages, electrically conductive coatings on the inner walls of the heater passages in ohmic contact relation to the resistor body material, a first electrically conductive interconnection coating on one end of the resistor body electrically connecting the ohmic contact coatings in alternate ones of the heater passages together at said one end of the body, a second electrically conductive interconnection coating on the opposite end of the resistor body electrically connecting the ohmic contact coatings in the other heater passages together at said opposite end of the body, means mounting the resistor body with the heater passages aligned with said air-fuel passage to pass said air-fuel mixture through the heater passages in heat-transfer relation to the resistor body, and means for connecting said interconnection coatings in an electrical circuit to direct electrical current through said webs of resistor material to heat the resistor body for heating the air-fuel mixture directed through the heater passages.

5. A carburetion system as set forth in claim 4 wherein said heater means is mounted at the outlet of said air-fuel passage.

6. A carburetion system as set forth in claim 5 wherein said first and second interconnection coatings on said resistor body each include a portion thereof extending circumferentially around the sides of the body adjacent a respective end of the body, and said means for connecting said interconnection coatings in an electrical circuit comprise generally wave-shaped annular terminals fitted around the resistor body in resilient electrical engagement with said portions of the respective interconnection coatings.

7. A carburetion system as set forth in claim 6 having housing means enclosing said resistor body, said housing means having a spacer of electrical insulating material with an aperture therein fitted around the resistor body, said housing means having a pair of outer housing sections of electrical insulating material each with a recess therein and with an aperture communicating with said recess, said housing sections having said recesses fitted over the terminals at the respective ends of the resistor body with said apertures aligned with said body passages and being secured in sealed relation to respective opposite sides of the spacer for positioning the resistor body within said housing means.

8. A carburetion system as set forth in claim 7 wherein each of said annular terminals has a portion extending laterally from the terminal to extend exteriorly of the housing means through openings in sides of the housing means.

* * * * *